Patented May 2, 1944

2,347,925

UNITED STATES PATENT OFFICE 2,347,925

AIR SEAL COMPOSITION FOR PNEUMATIC TIRES

Noel Owens, Chanute, Kans., assignor to Film-O-Seal Company

No Drawing. Application July 3, 1941, Serial No. 400,985

3 Claims. (Cl. 106—33)

My invention relates to a composition for sealing the pores and small openings in the inner tubes of pneumatic tires against the slow leakage of air, so that the proper air pressure may be maintained to prevent damage to the tire from under inflation.

A further object of the invention is to provide an adhesive mixture which, due to the rotation of the tires while the automotive vehicle on which they are mounted is in motion, will be spread by centrifugal force around the entire inner surface of the tube and be forced by the air pressure to effectively seal any ordinary punctures to which the tube may be subjected.

The main ingredients of my composition comprises a mixture of linseed meal or other vegetable matter that has been ground into fine particles, a saline solution, such as salt dissolved in water, and a preservative and antifreeze, such as alcohol and the saline solution.

In preparting the composition I prefer to use the ingredients in about the following proportions, viz:

| | Parts |
|---|---|
| Water | 5 |
| Salt | ¼ |
| Alcohol | 1 |
| Linseed meal | 4 |

Good results may be obtained, however, when the ingredients are varied within the following limits: water four to six parts, salt three-sixteenths to five-sixteenths part, and linseed meal three to five parts.

The salt is preferably of the common table variety which, on being dissolved in water provides a saline solution that acts as an antifreeze agent and also as a preservative to prevent rancidity of the linseed meal. The alcohol preferably is chemically pure and, like the saline solution, acts as a preservative and prevents the composition from freezing in winter.

In addition to the foregoing ingredients some dye-stuff and oil of wintergreen or other aromatic oil is added to impart an agreeable odor and color to the composition.

The composition may be readily injected into an inner tube through the valve stem after removal of the inner core.

In practice the composition will be spread by centrifugal force around the entire inner surface of the tube and form a film which will effectively seal the pores and any small openings in the inner tube. In the event of a puncture the composition will be forced by the air pressure into the puncture and thereby act as a filler that will provide an efficient sealing patch which will effectively prevent the escape of air from the tube. Should a blow-out occur the composition will enter the opening and retard the escape of air from the inner tube, thereby enabling the driver to stop the car before a serious accident occurs.

The amount of composition employed will depend on the size of the motor vehicle and the tube. For a medium sized car with tires 6 x 16 inches about one quart of the mixture will suffice for each inner tube.

From the foregoing description it will be understood that I have provided a highly efficient antifreeze composition that will prevent flat tires due to slow leakage of air, or punctures, and while I have mentioned certain proportions for producing my sealing composition, I reserve the right to make such variations in proportions as properly fall within the spirit and scope of the invention as claimed.

I claim:

1. A composition comprising water 5 parts, salt ¼ part, alcohol 1 part, and linseed meal 4 parts.

2. A composition comprising four to six parts of water, seven-eights to one and one-eighth part of alcohol, three to five parts of linseed meal, and three-sixteenths to five-sixteenths part of salt.

3. A composition comprising four to six parts of water, seven-eighths to one and one-eighth parts of alcohol, three to five parts of linseed meal, three-sixteenth to five-sixteenths part of salt, an aromatic oil, and a dye-stuff.

NOEL OWENS.